(12) United States Patent
Calandra et al.

(10) Patent No.: US 7,774,106 B2
(45) Date of Patent: Aug. 10, 2010

(54) CRUISE CONTROL FADEC LOGIC

(75) Inventors: Salvatore Calandra, Montreal (CA); Keith Morgan, Montreal (CA)

(73) Assignee: Pratt - Whitney Canada Corp., Longueuil, Quebec (CA)

( * ) Notice: Subject to any disclaimer, the term of this patent is extended or adjusted under 35 U.S.C. 154(b) by 788 days.

(21) Appl. No.: 11/615,038

(22) Filed: Dec. 22, 2006

(65) Prior Publication Data
US 2008/0149778 A1 Jun. 26, 2008

(51) Int. Cl.
*G06F 19/00* (2006.01)
*B64D 31/08* (2006.01)

(52) U.S. Cl. .................. 701/14; 244/75.1; 340/945

(58) Field of Classification Search .............. 701/1, 701/3, 14; 340/945, 969, 973, 978, 75.1–76, 340/963; 244/75.1, 76
See application file for complete search history.

(56) References Cited

U.S. PATENT DOCUMENTS

| | | | |
|---|---|---|---|
| 3,638,092 A | 1/1972 | Kammerer | |
| 3,742,325 A | 6/1973 | Andresen, Jr. | |
| 3,840,200 A | 10/1974 | Lambregts | |
| 3,848,833 A | 11/1974 | Rauschelbach | |
| 3,880,385 A | 4/1975 | Reynolds et al | |
| 3,887,148 A | 6/1975 | Devlin | |
| 4,043,526 A | 8/1977 | Donley et al. | |
| 4,205,814 A | 6/1980 | Larson et al. | |
| 4,357,663 A | 11/1982 | Robbins et al. | |
| 4,467,429 A | 8/1984 | Kendig | |
| 4,471,439 A | 9/1984 | Robbins et al. | |
| 4,536,843 A | 8/1985 | Lambregts | |
| 4,569,021 A | 2/1986 | Larson et al. | |
| 4,589,616 A | 5/1986 | Zweifel | |
| 4,599,698 A | 7/1986 | Fischer et al. | |
| 4,609,988 A | 9/1986 | Zweifel | |
| 4,686,825 A | 8/1987 | Cavasa et al. | |
| 4,767,085 A | 8/1988 | Boudreau et al. | |
| 4,912,642 A | 3/1990 | Larsen et al. | |
| 5,029,778 A | 7/1991 | DeLuca | |
| 5,078,345 A | 1/1992 | De Vries et al. | |
| 5,106,035 A * | 4/1992 | Langford, III | 244/59 |
| 5,517,819 A | 5/1996 | Martin | |
| 5,833,177 A | 11/1998 | Gast | |
| 5,836,546 A | 11/1998 | Gast | |
| 5,908,176 A | 6/1999 | Gilyard | |
| 5,931,102 A | 8/1999 | Grahl | |
| 6,086,015 A * | 7/2000 | MacCready, Jr. | 244/7 B |
| 6,186,447 B1 | 2/2001 | Virdee | |
| 6,543,719 B1 * | 4/2003 | Hassan et al. | 244/17.13 |
| 6,578,794 B1 | 6/2003 | Clark et al. | |

FOREIGN PATENT DOCUMENTS

| | | |
|---|---|---|
| EP | 0030066 | 9/1984 |
| EP | 0120855 | 1/1989 |
| EP | 0122718 | 1/1989 |
| EP | 0444541 | 8/1995 |
| GB | 1435201 | 5/1976 |
| GB | 1435202 | 5/1976 |
| GB | 1435203 | 5/1976 |

* cited by examiner

*Primary Examiner*—Yonel Beaulieu
(74) *Attorney, Agent, or Firm*—Ogilvy Renault LLP

(57) ABSTRACT

The present invention provides an alternative to the auto-throttle integrated in an aircraft autopilot by restricting the conditions in which the system operates. The proposed system removes the auto-throttle function from the autopilot system and gives it directly to the Full Authority Digital Engine Control (FADEC). A Cruise Control mode is available to the pilot only under stable flight conditions.

13 Claims, 3 Drawing Sheets

CRUISE CONTROL FADEC LOGIC

TECHNICAL FIELD

The invention relates generally to aircraft control systems and, more particularly, to controlling an aircraft flight speed.

BACKGROUND OF THE ART

The Full Authority Digital Engine Control (FADEC) is an electronic system used for controlling aircraft engine performance. The FADEC receives a signal from the throttle lever or the autopilot system and, among other things, digitally calculates and precisely controls the fuel flow rate to the engines providing precise thrust.

An autopilot system generally automates the aircraft handling during take-off, ascent, level, descent, approach and landing phases of flight. Typical autopilot systems incorporate an auto-throttle for controlling the speed of the aircraft. An autopilot system is complex and expensive and is submitted to very high reliability standards as malfunction can impact safety.

Accordingly, there is a need for an aircraft control system with reduced complexity.

SUMMARY

In one aspect, the present invention provides a method for controlling a flight speed of an engine propelled aircraft. The method comprises: receiving a cruise control request signal for engaging a cruise control mode of operation of the engine; receiving a flight stability condition signal indicative of whether a flight stability condition is met; activating the cruise control mode upon receipt of the cruise control request signal and when the flight stability condition is met; receiving a flight speed signal indicative of the flight speed; and in the cruise control mode, adjusting a thrust setting of the engine within a given range according to the flight speed signal to maintain the flight speed substantially constant.

In a second aspect, the present invention provides a flight speed control system for controlling a flight speed of an engine propelled aircraft. The system comprises a first input for receiving a cruise control request signal for engaging a cruise control mode of operation of the engine; a second input for receiving a flight stability condition signal indicative of whether a flight stability condition is met; a logic circuit for activating a cruise control mode upon receipt of the cruise control request signal and when the flight stability condition is met; a third input for receiving a flight speed signal indicative of the flight speed; and an engine controller for adjusting a thrust setting of the engine within a given range according to the flight speed signal to maintain the flight speed substantially constant while in the cruise control mode.

In a third aspect, the present invention provides a flight speed control system for controlling the flight speed of an engine propelled aircraft. The system comprises means for receiving a cruise control request signal for engaging a cruise control mode of operation of the engine; means for receiving a flight stability condition signal indicative of whether a flight stability condition is met; means for activating a cruise control mode upon receipt of the cruise control request signal and when the flight stability condition is met; means for receiving a flight speed signal indicative of the flight speed; and means for adjusting a thrust setting of the engine within a given range according to the flight speed signal to maintain the flight speed substantially constant while in the cruise control mode.

Further details of these and other aspects of the present invention will be apparent from the detailed description and figures included below.

DESCRIPTION OF THE DRAWINGS

Reference is now made to the accompanying Figures depicting aspects of the present invention, in which.

DETAILED DESCRIPTION

Figure 1:
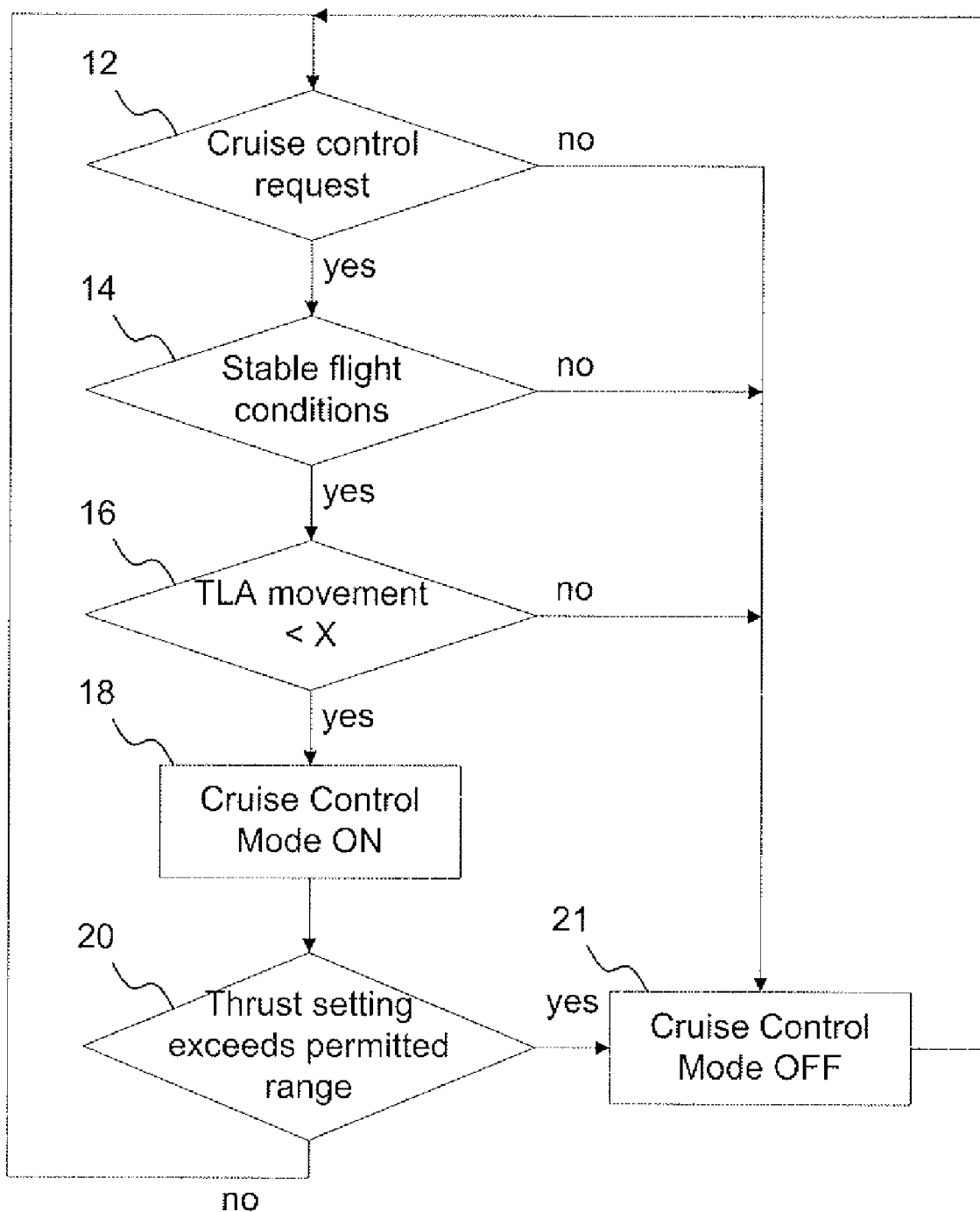
FIG. 1 is a flow chart illustrating Cruise Control Logic, according to one embodiment of the invention.

FIG. 1 illustrates the behavior of the Cruise Control Logic (CCL). The pilot engages Cruise Control by activating a Cruise Control request, i.e., selecting "Cruise Control ON", in step 12. The Full Authority Digital Engine Control (FADEC) then engages Cruise Control Mode in step 18 if and only if certain aircraft flight conditions, altitude and attitude for example, are stable (step 14) and, optionally, the pilot thrust instruction is stable (step 16), i.e., Throttle lever Angle movements do not exceed a specified amount.

In Cruise Control Mode (step 18), the FADEC system modulates the engine fuel flow, by controlling the throttle position, to substantially maintain the flight speed constant. The authority of modulation is sized to allow a reasonable period for unattended throttle operation, but is not intended to maintain speed throughout the entire flight.

While Cruise Control Mode (step 18) is activated, a misalignment of thrust setting-to-throttle lever angle may gradually grow until the authority assigned to the CCL is no longer adequate to maintain the target speed, i.e. the thrust setting exceeds the given permitted range (step 20). At this point, the Cruise Control Mode is deactivated (step 22) and the pilot needs to readjust the throttle and reactivate the Cruise Control. The Cruise Control Mode can be deactivated by either one of the following conditions: the pilot switches Cruise Control OFF, flight conditions are no longer stable, throttle lever has been moved or a throttle movement is applied beyond the amount equivalent to the authority of the CCL. Alternatively, some of these deactivation conditions can be omitted.

Figure 2:
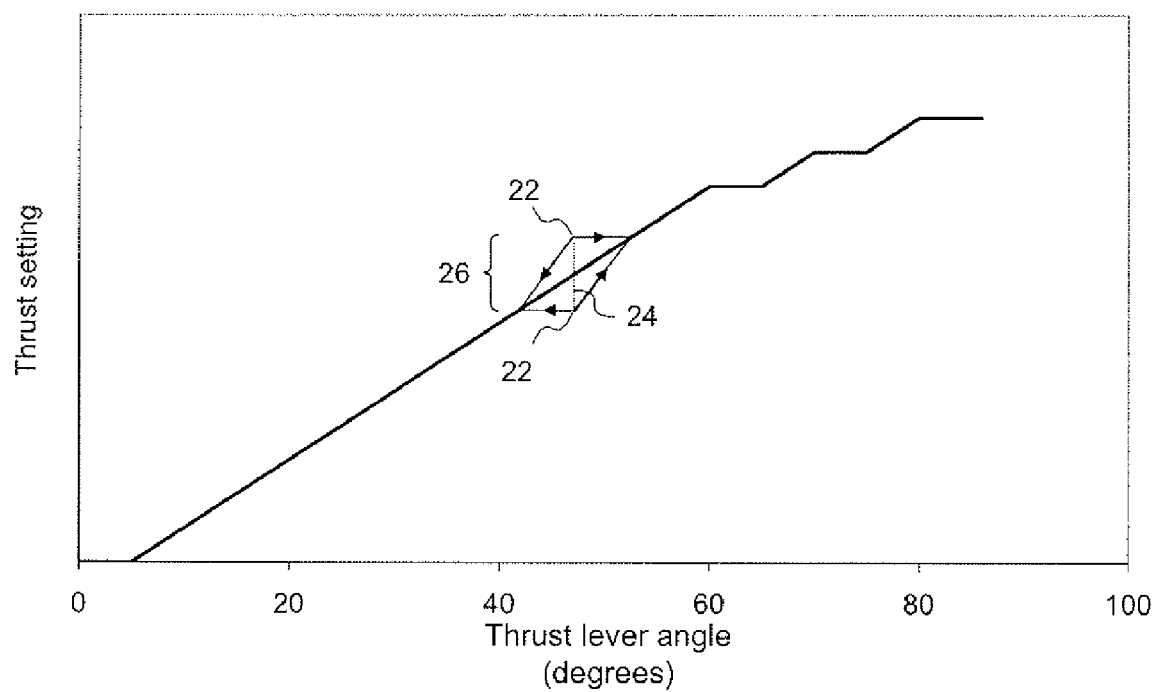
FIG. 2 is graph illustrating the authority of a Cruise Control system in accordance with the relation between the throttle lever angle and the corresponding thrust setting.

FIG. 2 shows the relation between the throttle lever angle and the corresponding thrust setting used by the FADEC to control fuel flow. In Cruise Control Mode, the throttle lever angle remains unchanged, unless the pilot applies a movement to the throttle lever to deactivate the Cruise Control Mode, while the throttle position, and accordingly the corresponding thrust setting, is adjusted to maintain a constant flight speed. A misalignment of thrust setting-to-throttle lever angle relation thus gradually grows. Since the authority of the Cruise Control Logic is limited to relatively narrow fluctuations, the Cruise Control Mode is deactivated when the misalignment reaches a given limit 22, i.e. when the throttle position goes beyond a given range 24. In order to smoothly exit from the Cruise Control Mode and return to pilot control with monotonic throttle movements, a reset dead band 26 is integrated to the system. The reset dead band 26 provides a path to return to the thrust setting-to-throttle lever angle curve when exiting the Cruise Control Mode.

Figure 3:
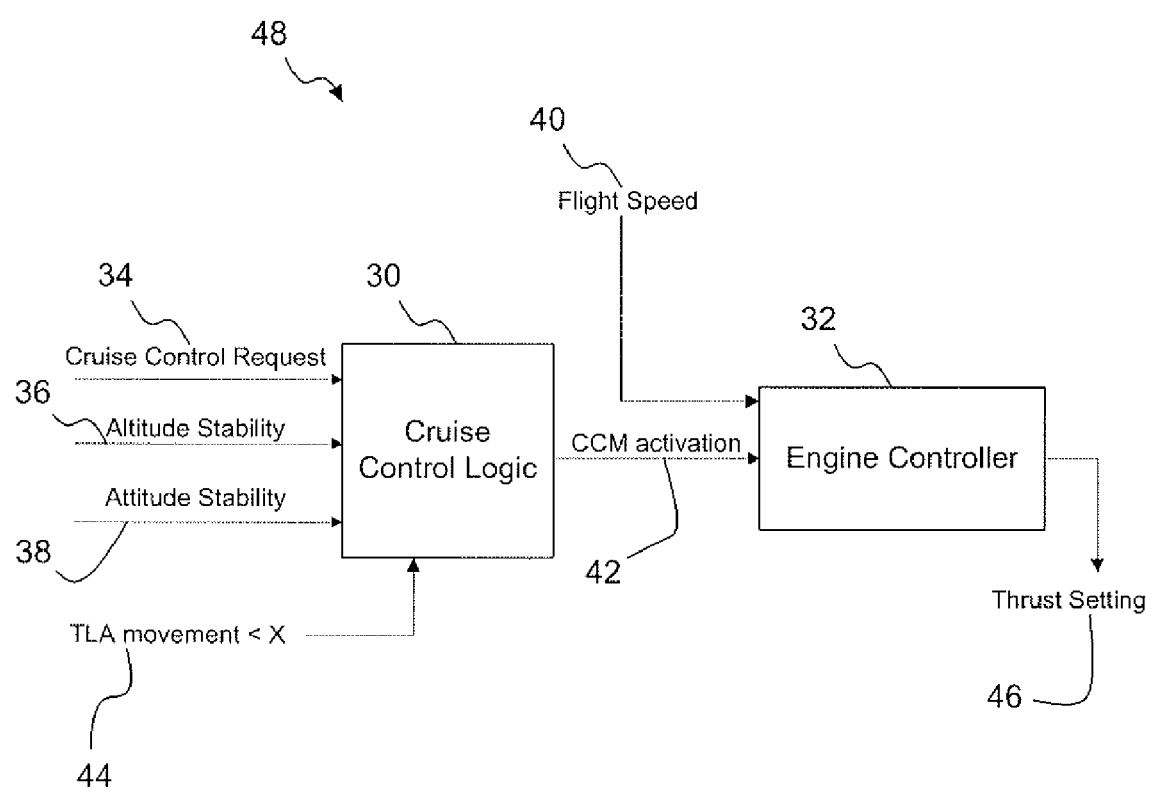
FIG. 3 is a block diagram of a flight speed control system.

FIG. 3 show an embodiment of the flight speed control system 48 which controls the flight speed of an aircraft. The flight control system 48 comprises a first input for receiving a cruise control request signal 34 for engaging a cruise control mode of operation of the aircraft engine. The flight control system 48 further comprises a second input for receiving a flight stability condition signal indicative of whether a flight stability condition is met. In the embodiment shown in FIG. 3, flight stability condition signal comprises both an altitude stability signal 36 and an attitude stability signal 38. The flight control system 48 further comprises a logic circuit for activating a cruise control mode, and hence for producing a Cruise Control Mode (CCM) activation signal 42, upon receipt of the cruise control request signal 34 and when the flight stability condition is met. The flight control system 48 also comprises a third input for receiving a flight speed signal 40 indicative of the flight speed of the aircraft. Finally, the flight control system 48 comprises an engine controller 32 for adjusting a thrust setting 46 of the engine within a given range according to the flight speed signal 40 to maintain the flight speed substantially constant while in the cruise control mode. Alternatively, the flight control system 48 comprises a fourth input for receiving a signal indicative of a stability of a pilot thrust instruction 44. The stability of the pilot thrust instruction acting as a further condition for activating the cruise control mode. In an embodiment, the pilot thrust instruction is the throttle lever angle.

The system described herein offer an alternative to the auto-throttle integrated in an aircraft autopilot system by restricting the conditions in which the system operates. The proposed system removes the auto-throttle function from the autopilot system, and hence the aircraft speed control, and gives it directly to the Full Authority Digital Engine Control (FADEC). Cruise Control Logic (CCL) is incorporated into the FADEC. Cruise Control Mode is available to the pilot only when stable flight conditions are communicated to the FADEC.

The above description is meant to be exemplary only, and one skilled in the art will recognize that changes may be made to the embodiments described without department from the scope of the invention disclosed. For example, the flight stability condition could include speed, altitude, pitch or roll stability alone or in combination. Still other modifications which fall within the scope of the present invention will be apparent to those skilled in the art, in light of a review of this disclosure, and such modifications are intended to fall within the appended claims.

What is claimed is:

1. A method for controlling at least one aircraft engine, the method being performed by a digital control system and comprising:
   receiving a cruise control request signal for engaging a cruise control mode of operation of the at least one engine;
   receiving a flight stability condition signal indicative of whether a flight stability condition is met, the flight stability condition being met only when aircraft altitude and attitude are stable;
   activating the cruise control mode upon receipt of the cruise control request signal and when the flight stability condition is met;
   receiving a flight speed signal indicative of the flight speed of the aircraft; and
   in the cruise control mode, automatically adjusting only a thrust setting of the at least one engine within a given range according to the flight speed signal to maintain the flight speed substantially constant.

2. The method as claimed in claim 1, further comprising deactivating the cruise control mode when the thrust setting exceeds the given range.

3. The method as claimed in claim 1, further comprising deactivating the cruise control mode when receiving a signal requesting cruise control deactivation.

4. The method as claimed in claim 1, further comprising receiving a signal indicative of a stability of a pilot thrust instruction, the stability of the pilot thrust instruction acting as a further condition for activating the cruise control mode.

5. The method as claimed in claim 4, further comprising deactivating the cruise control mode when the pilot thrust instruction does not meet a stability criteria.

6. The method as claimed in claim 4, wherein the pilot thrust instruction comprises a throttle lever angle position.

7. A control system for controlling at least one aircraft engine, the system comprising:
   a first input for receiving a cruise control request signal for engaging a cruise control mode of operation of the at least one engine;
   a second input for receiving a flight stability condition signal indicative of whether a flight stability condition is met, the flight stability condition being met only when aircraft altitude and attitude are stable;
   a logic circuit for activating a cruise control mode upon receipt of the cruise control request signal and when the flight stability condition is met;
   a third input for receiving a flight speed signal indicative of the flight speed; and
   an engine controller in the cruise control mode configured for automatically adjusting only a thrust setting of the at least one engine within a given range according to the flight speed signal to maintain the flight speed substantially constant while in the cruise control mode.

8. The flight speed control system as claimed in claim 7, wherein the logic circuit is further for deactivating the cruise control mode when the thrust setting exceeds the given range.

9. The flight speed control system as claimed in claim 7, wherein the logic circuit is further for deactivating the cruise control mode when receiving a signal requesting cruise control deactivation.

10. The flight speed control system as claimed in claim 7, further comprising a fourth input for receiving a signal indicative of a stability of a pilot thrust instruction, the stability of the pilot thrust instruction acting as a further condition for activating the cruise control mode.

11. The flight speed control system as claimed in claim 10, wherein the logic circuit is further for deactivating the cruise control mode when the pilot thrust instruction does not meet a stability criteria.

12. The flight speed control system as claimed in claim 10, wherein the pilot thrust instruction comprises a throttle lever angle position.

13. A control system for controlling at least one aircraft engine, the system comprising:
   a logic circuit configured to receive a cruise control request signal for engaging a cruise control mode of operation of the at least one engine; receive a flight stability condition signal indicative of whether a flight stability condition is met, the flight stability condition being met only when aircraft altitude and attitude are stable; and activate a cruise control mode upon receipt of the cruise control request signal and when the flight stability condition is met; and
   an engine controller in the cruise control mode configured to receive a flight speed signal indicative of the flight speed of the aircraft and automatically adjust only a thrust setting of the at least one engine within a given range according to the flight speed signal to maintain the flight speed substantially constant while in the cruise control mode.

* * * * *